(12) United States Patent
Joul (10) Patent No.: US 10,659,463 B2
(45) Date of Patent: May 19, 2020

(54) DELIVERING ANONYMOUS COMMUNICATION BETWEEN CUSTOMERS AT CUSTOMER CARE SITE

(71) Applicant: T-Mobile USA, Inc., Bellevue, WA (US)

(72) Inventor: Christopher Harvey Joul, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/871,189

(22) Filed: Sep. 30, 2015

(65) Prior Publication Data

US 2017/0093858 A1 Mar. 30, 2017

(51) Int. Cl.
| H04L 29/06 | (2006.01) |
| G06F 21/62 | (2013.01) |
| G06F 21/35 | (2013.01) |

(52) U.S. Cl.
CPC .......... *H04L 63/0884* (2013.01); *G06F 21/35* (2013.01); *G06F 21/6263* (2013.01); *H04L 63/0421* (2013.01); *H04L 63/102* (2013.01)

(58) Field of Classification Search
CPC .......................... H04L 63/0884; H04L 63/102
See application file for complete search history.

(56) References Cited

U.S. PATENT DOCUMENTS

| 7,685,414 | B1 | 3/2010 | Appenzeller et al. |
| 8,676,596 | B1 | 3/2014 | Franson et al. |
| 8,903,936 | B2 | 12/2014 | Martin et al. |
| 9,075,777 | B1 | 7/2015 | Pope et al. |
| 2001/0016915 | A1* | 8/2001 | Sugano ................. H04L 63/101 726/7 |
| 2003/0174830 | A1 | 9/2003 | Boyer |
| 2005/0187781 | A1* | 8/2005 | Christensen ............ H04L 51/04 709/207 |

(Continued)

FOREIGN PATENT DOCUMENTS

| CN | 108431791 A | 8/2018 |
| CN | 108476402 A | 8/2018 |

(Continued)

OTHER PUBLICATIONS

International Search Report and Written Opinion in PCT/US2016/054205 dated Dec. 20, 2016 in 15 pages.

(Continued)

*Primary Examiner* — Brian F Shaw
(74) *Attorney, Agent, or Firm* — Knobbe, Martens, Olson & Bear, LLP (57) ABSTRACT

A customer care site includes a content item posted by a first user. The content item is associated with a first contact link for requesting communication with the first user. When a second user tries to contact the first user by selecting the first contact link, a computing system associated with the customer care site identifies contact information of the first user using information associated with the first contact link. The computing system can establish a communication session between the first user and the second user without revealing contact information of the first user and the second user to each other during the communication session.

16 Claims, 6 Drawing Sheets

(56) References Cited

U.S. PATENT DOCUMENTS

| | | |
|---|---|---|
| 2007/0259325 A1* | 11/2007 | Clapper .............. G09B 5/14 434/350 |
| 2008/0159271 A1 | 7/2008 | Kutt |
| 2008/0235242 A1 | 9/2008 | Swanburg et al. |
| 2009/0125521 A1 | 5/2009 | Petty |
| 2010/0246576 A1 | 9/2010 | Bustamente |
| 2012/0042392 A1 | 2/2012 | Wu |
| 2014/0278785 A1 | 9/2014 | Gaedcke et al. |
| 2014/0282083 A1 | 9/2014 | Gaetano et al. |
| 2014/0297362 A1* | 10/2014 | Kumar .............. G06Q 30/0201 705/7.29 |
| 2015/0112826 A1 | 4/2015 | Crutchfield et al. |
| 2015/0113054 A1 | 4/2015 | Li |
| 2015/0178371 A1 | 6/2015 | Seth et al. |
| 2015/0254675 A1 | 9/2015 | Kannan et al. |
| 2015/0310377 A1* | 10/2015 | Schlumberger ...... G06Q 30/016 705/7.15 |
| 2017/0091390 A1 | 3/2017 | Joul |

FOREIGN PATENT DOCUMENTS

| | | | |
|---|---|---|---|
| EP | 1333637 A1 * | 8/2003 | ............ H04L 29/06 |
| EP | 2887608 A1 | 6/2015 | |
| EP | 3356947 | 8/2018 | |
| EP | 3357265 | 8/2018 | |
| WO | WO 2014/116835 A2 | 7/2014 | |
| WO | WO 2017/058930 A1 | 4/2017 | |
| WO | WO 2017/058931 A1 | 4/2017 | |

OTHER PUBLICATIONS

International Search Report and Written Opinion in PCT/US2016/054204 dated Dec. 15, 2016 in 13 pages.
International Preliminary Report on Patentability and Written Opinion in PCT/US2016/054205 dated Apr. 3, 2018 in 8 pages.
International Preliminary Report on Patentability and Written Opinion in PCT/US2016/054204 dated Apr. 3, 2018 in 8 pages.
Exended European Search Report in 16852500.4 dated Feb. 28, 2019 in 8 pages.

* cited by examiner

DELIVERING ANONYMOUS COMMUNICATION BETWEEN CUSTOMERS AT CUSTOMER CARE SITE

BACKGROUND

A web site is one of the most important channels for a business to attract potential customers, sell products or services, and communicate with customers. A customer care site provides a variety of information regarding promotion, billing, and technical issues. Some users of the customer care site can interact with other users by posting or answering questions. However, such asynchronous interactions between users may not provide satisfactory communications to address certain issues. Some users may want to interact further, in real-time, with another user of the customer care site while not compromising their privacy.

BRIEF DESCRIPTION OF DRAWINGS

The foregoing aspects and many of the attendant advantages of this disclosure will become more readily appreciated by reference to the following detailed description, when taken in conjunction with the accompanying drawings, wherein.

DETAILED DESCRIPTION

Some embodiments of the present disclosure are directed to enabling real-time communication between users of a customer care site while protecting their private information. Specific embodiments and example applications of the present disclosure will be described with reference to the drawings. These embodiments and example applications are intended to illustrate, and not limit, the present disclosure.

Figure 1:
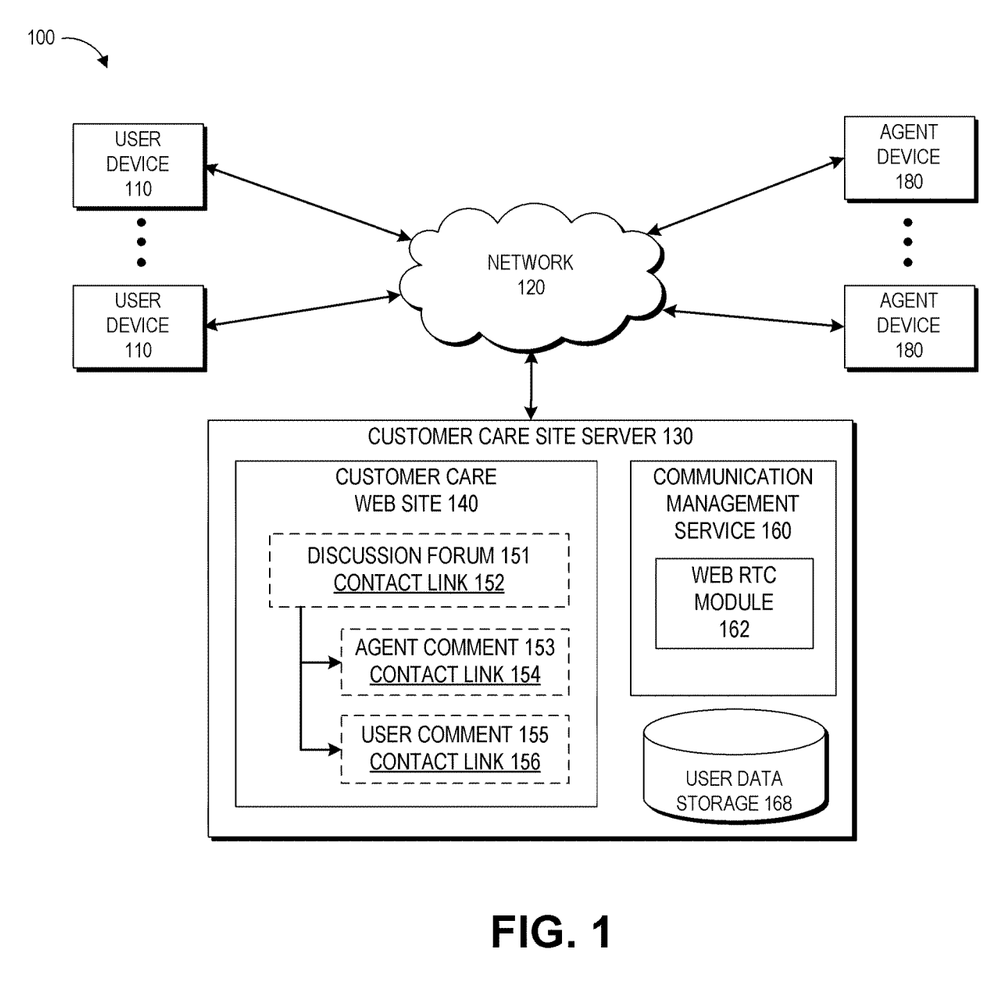
FIG. 1 is a block diagram depicting an illustrative environment for enabling communication between users of a customer care site.

FIG. 1 is a block diagram depicting an illustrative environment 100 for enabling anonymous communication between users of a customer care site. The environment shown in FIG. 1 includes a user device 110, a network 120, a customer care site server 130, and an agent device 180.

In the networked environment 100, the customer care site server 130 provides a customer care site 140. The customer care site 140 may be a web site through which users can exchange information on numerous topics, such as products, services, and the like. Using the user device 110 connected to the network 120, users can initiate or participate in a discussion forum by submitting questions or comments about a particular topic through the customer care site 140. The customer care site server 130 can include and utilize a user data storage 168 to store and/or manage one or more records associated with all or a portion of the discussion, including an initial question or comment and any subsequent related questions or comments, as well as information regarding users who submitted individual questions or comments. The customer care site server 130 can, for example, create one or more identifiers for the individual users who authored a question or comment, as well as one or more identifiers for the discussion forum or topics included in the discussion forum, and provide various mappings between these identifiers. Accordingly, the discussion forum and/or individual questions or comments made in the discussion forum can be associated in the user data storage 168 with one or more identifiers of the individual users who authored a question or comment. The customer care site server 130 can also store contact information provided by the users in association with identifiers of the users.

The customer care site 140, provided by the customer care site server 130, may also include a contact link in association with individual questions or comments in a discussion forum. Thus, while browsing a page of the customer care site 140 using the user device 110, a user (contact requesting user) can select a contact link to send a request to contact another user (target user) from the user device 110 to the customer care site server 130. In one embodiment, selection of a contact link by a contact requesting user of the customer care site 140 causes an interface, such as another web page of the customer care site 140, to be displayed on the user device 110 of the contact requesting user. The displayed interface can be configured to receive further information from the contact requesting user regarding his or her request to communicate with another user or a customer care agent (target user) who posted the associated question or comment. For example, the interface may allow the contact requesting user to submit an additional question specifically to the target user. The interface may also allow the contact requesting user to provide identifying information to enable the target user to identify or otherwise contact the contact requesting user.

In another embodiment, selection of the contact link may cause the customer care site server 130 to automatically generate a generic request from the contact requesting user to the target user to further discuss the associated question or comment, and thus a further web page may not be initially generated to obtain further contextual information from the contact requesting user about his or her additional inquiry prior to contacting the target user. In some embodiments, if the contact requesting user is logged into the customer care site 140, or otherwise identifiable by the customer care site 140, the generic contact request may automatically provide the target user with information identifying the contact requesting user. Alternatively, the customer care site server 130 may use identification information corresponding to the contact requesting user to determine stored preferences of the contact requesting user, such as what type of contact information to automatically provide to the target user, such as a name, phone number, email, and the like of the contact requesting user.

In any of the foregoing embodiments, the contact link includes one or more identifiers for enabling the customer care site server 130 to contact the target user. The one or more identifiers may include a confidential identifier corresponding to the target user which does not disclose any information that would specifically identify the target user to the contact requesting user, thus maintaining the target user's privacy should, for example, the target user not want to further engage with the contact requesting user. Thus, the request from the user device 110 of the contact requesting user includes information that can be used to identify the target user who posted the question or comment associated with the selected contact link.

In response to selection of the contact link from the user device 110, the customer care site server 130 can also identify contact information of the target user from the user data storage 168 using information included in the request. In one embodiment, using the identified contact information, the customer care site server 130 initiates a process to establish a communication channel between user devices 110 of the contact requesting user and the target user. Prior to making a call to the target user's device, the customer care site server 130 can check a data entry in the user data storage 168 for a predetermined criterion (condition) for allowing a call to the target user's device. The predetermined criterion can be an expiration criterion of a call link, such as an expiration time for the call link or a maximum or threshold number of allowed uses of the contact link or a maximum or threshold number of allowed uses of the contact link in a selected period of time or interval. As will be described further below, the target user may select or set the expiration criterion, such as when submitting a comment, or otherwise making their expertise available, in a discussion forum. In this embodiment, an option in the user interface may be presented to the user to designate the predetermined criterion. In other embodiments, the predetermined criterion, such as the expiration criterion, may be determined from a profile of the user. In yet other embodiments, customer care site server 130 may automatically set the predetermined criterion or criteria to control the validity of the call links. Thus, in any of these embodiments, once a call link has expired, or otherwise not met the predetermined criterion, the customer care site server 130 may disable or remove the corresponding call link from the discussion forum in the customer care web site 140.

Returning to FIG. 1, in order to establish a communication channel between user devices 110, the customer care site server 130 can utilize a communication management service 160 to make a call to the target user's device. While making a call to the target user's device, the communication management service 160 can prevent the target user's device from displaying an identification or an address on the network 120 associated with the calling user's device. In one embodiment, the communication management service 160 does not provide, to the target user's device, caller ID information representing an identification or an address of the calling user's device on the network 120. In another embodiment, the communication management service 160 can overwrite an identification or an address of the calling user's device on the network 120 with an alternative identification, such as an identification of customer care site server 130, the customer care web site 140, or a specific customer care agent or customer care agent device 180. In this way the calling user's identity is shielded from the called party. Accordingly, the target user cannot call back to the calling user using the alternative identification via the network 120. Similarly, the communication management service 160 can also prevent the calling user's device from displaying an identification or an address on the network 120 associated with the target user's device. Again, in one embodiment, the communication management service 160 does not provide, to the calling user's device or even to the customer care web site 140, caller ID information representing an identification or an address of the target user's device on the network 120. In another embodiment, the communication management service 160 can overwrite an identification or an address of the target user's device on the network 120 with an alternative identification, such as an identification of customer care site server 130, the customer care web site 140, or a specific customer care agent or customer care agent device 180. In this way the target user's identity is shielded from anyone accessing the discussion forum on the customer care web site 140.

In certain embodiments, the communication management service 160 causes the target user's device to display information for notifying that the incoming call is related to a particular discussion forum, question, and/or comment on the customer care site 140. For example, while the communication management service 160 can initiate a voice/video call, for example, from a first mobile phone of the contact requesting user to a second mobile phone of the target user, the communication management service 160 prevents the second mobile phone from displaying the first mobile phone's number and/or vice versa. In one example, the communication management service 160 does not provide the first mobile phone's number to the second mobile phone. In another example, the communication management service 160 may overwrite the first mobile phone's identification information with an alternative identification when it makes a call to the second mobile phone. The alternative identification by itself does not specifically identify the first mobile phone on a telephone network. Accordingly, the second mobile phone cannot make a call to the first mobile phone using the alternative identification provided to the second mobile phone.

The user device 110 could be one of a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 110 may execute a browser application to communicate via the network 120 with other computing systems, such as the customer care site server 130 and the agent device 180.

Likewise, the agent device 180 could also be one of a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual agent devices 180 may execute a browser application to communicate via the network 120 with other computing systems, such as the customer care site server 130 and the user device 110.

The network 120 may be a publicly accessible network of linked networks, possibly operated by various distinct parties, such as the Internet. In other embodiments, the network 120 may include a private network, personal area network, local area network, wide area network, cable network, satellite network, cellular telephone network, etc., or combination thereof, each with access to and/or from the Internet. The user device 110 communicates with the customer care site server 130 via the network 120. The customer care site server 130 can facilitate and/or establish a voice/video call between one user device 110 and another or the agent device 180, such as in response to a request from a user device 110 of a contact requesting user via selection of a contact link 154, 156 on the customer care web site 140. The customer care site server 130 can utilize the communication management service 160 for establishing a communication channel between user devices 110 and/or agent devices 180 in response to a request made via the contact links 154, 156.

The customer care site server 130 is operable to provide the customer care site 140, which is accessible to the user devices 110. The customer care site 140 can be a web site containing information for existing customers, potential customers, or other users of the web site. The customer care site 140 provides a plurality of web pages. As noted above, various web pages may also provide a forum through which users can exchange information on numerous topics, such as products, services, and the like. The web pages may include one or more landing pages and subpages of the landing pages. The customer care site 140 may provide different landing pages for different types of customer devices and/or browsing software of the customer devices. The customer care site server 130 can identify a type of the customer device and/or browsing software of the customer device using a script or code embedded in a page of customer care site 140. Based on the identified type of the customer device and/or the browsing software, the customer care site 130 provides a corresponding landing page. In some embodiments, when the customer care site server 130 requires a specific feature (for example, a web-RTC feature) to implement some embodiments of the present invention, such as establishing a communication channel between user devices 110 and/or agent devices 180, a browser that does not support the specific feature may be directed to a landing page with limited compatibility 144 rather than a landing page 142 that is configured to utilize the specific feature. The landing page with limited compatibility 144 includes an informative message that additional features may be available for different devices or browsers.

Users of the customer care site 140 can navigate from the landing page to different pages, such as a page having a discussion forum 151, based on their needs. The users can initiate a discussion in a discussion forum by posting a question or comment about a product/service for example. The discussion forum 151 and any comments or questions, such as comments 153, 155, on the customer care site 140 can have corresponding contact links 152, 154, 156 for requesting a call to a user (including a customer care agent) of the customer care web site 140. Each of the contact links 152, 154, 156 can be associated with its respective contact information that specifies an address/number to which a call for contacting the author of the question and/or comment will be forwarded. In some embodiments, the contact links 152, 154, 156 do not reveal the associated contact information in original form as provided by the author of the question and/or comment for security purposes.

The contact information associated with the contact link 152 may be a telephone number, an IP address, or any other type of identifier that is associated with a telephone/device of the author of the initial question or comment in the discussion forum 151. The contact information associated with the contact link 154 may be a telephone number, an IP address, or any other type of identifier that is associated with an agent device 180 via which the agent comment 153 has been posted. The contact information associated with the contact link 156 may be a telephone number, an IP address, or any other type of identifier that is associated with a user device 110 via which the user comment 155 has been posted. In some embodiments, the contact links 152, 154, 156 do not reveal corresponding contact information in its original form. When a user clicks or selects one of the contact links, the user device 110 and/or the customer care site server 130 transmits a request for establishing a communication session to the communication management service 160.

The communication management service 160 is a computing component of the customer care site server 130 that is operable to manage communication between the user devices 110 and/or the agent devices 180 in response to a request for establishing a communication session. The communication management service 160 includes the web RTC module 162 that is operable to establish, facilitate, and manage a communication session (voice/video/live chat) between, for example, the user device 110 and the agent device 180, in cooperation with corresponding web RTC components in the user device 110 and the agent device 180. A web browser that supports a web RTC feature can cooperate with the web RTC module 162 to establish a communication session between the user devices 110 and/or the agent devices 180.

While the communication management service 160 is operable to establish a communication session between a contact requesting device (of a contact requesting user) and a destination device (of a target user), the communication management service 160 may not provide the contact requesting device's original contact information to the destination device. Original contact information is contact information provided by users of the customer care site 140 for communicating with other users. While the communication management service 160 utilizes the original contact information of the contact requesting device for establishing a communication channel between the contact requesting device and the destination device, the communication management service 160 does not provide the original contact information of the contact requesting device to the destination device. Also, while the communication management service 160 utilizes the original contact information of the destination device for establishing a communication channel between the contact requesting device and the destination device, the communication management service 160 does not provide the original contact information of the destination device to the contact requesting device, thus preventing display thereof at the contact requesting device.

In some embodiments, the communication management service 160 can relay communication data between the contact requesting device and the destination device and provide alternative contact information to the contact requesting device and the destination device instead of the original (or actual) contact information. For example, the communication management service 160 establishes two separate communication sessions respectively with a contact requesting device and a destination device and facilitates management and connection of the two separate communication sessions while preventing exposure of the original contact information of the contact requesting device to the destination device and vice versa. In some embodiments, the communication management service 160 can also cause contact information of the communication management service 160 to be provided to the contact requesting device and/or the destination device, instead of the original contact information of the contact requesting device and/or the destination device.

In some embodiments, in response to a request from a user device 110 based on selection of a contact link, the communication management service 160 is operable to deliver information regarding the specific question or comment associated with the selected contact link to the target device. The target device is then able to display this information to help its user (target user) recognize the subject of the incoming call. The information associated with the specific question or comment can include a variety of information such as identification, title, and/or summary of the question or comment 151, 153 155.

The user data storage 168 can be a database that is configured to store and manage information of users of the customer care site 140. The user data storage 168 can store and manage a variety of information including identification of users, contact information of users, questions/comments posted by users, contact preferences of users, etc. The customer care site server 130 and the communication management module 160 can access information stored in the user data storage 168 for implementing embodiments of the present disclosure. In FIG. 1, the communication management service 160 is included in the customer care site server 130. However, in certain embodiments, the communication management service 160 can be implemented by another, separate computing system apart from the customer care site server 130.

Figure 2:
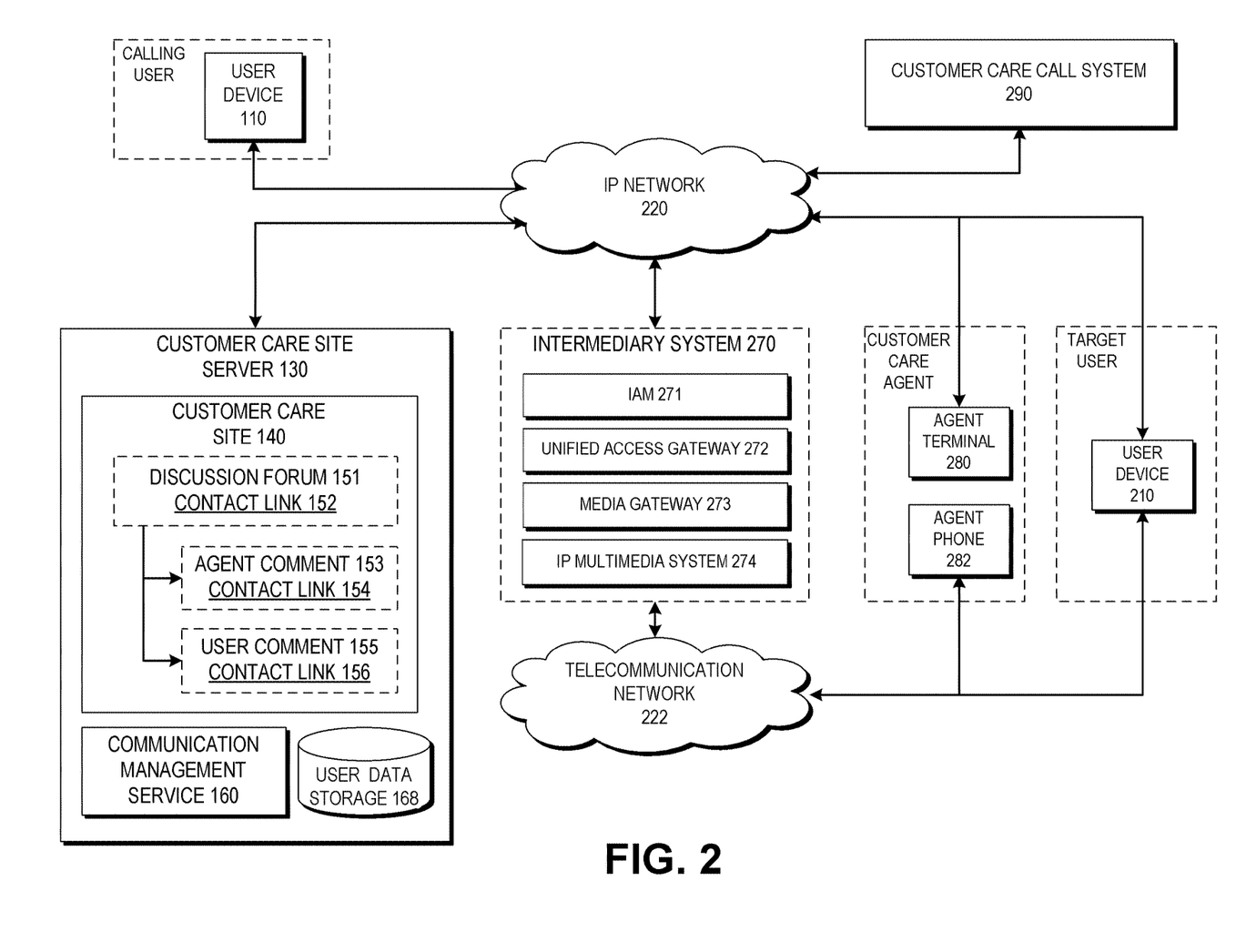
FIG. 2 is a block diagram depicting an illustrative environment including an intermediary system that is configured to manage communication between different networks.

FIG. 2 is a block diagram depicting an illustrative environment including an intermediary system 270 that is configured to manage communication between different communication networks. The environment shown in FIG. 2 includes user devices 110, 210, an IP network 220, a telecommunication network (voice telecommunication network) 222, a customer care site server 130 providing a customer care site 140, an intermediary system 270, an agent terminal 280, an agent phone 282, and a customer care call system 290.

The customer care site 140 includes an agent comment 153 and a user comment 155 in a discussion forum 151. The agent comment 153 is a comment posted by a customer care agent using the agent terminal 280 or the agent phone 282. The contact link 154 is associated with a telephone number, an IP address, or another type of identifier of the agent terminal 280 or the agent phone 282. The user comment 155 is a comment posted by a target user using the user device 210. The contact link 156 is associated with a telephone number, an IP address, or another type of identifier of the user device 210. The contact links 152, 154, 156 do not themselves reveal the direct or actual contact information of the agent terminal 280, the agent phone 282, or the user device 210, but instead include information that can be used by the customer care site server 130 to determine such information.

When a contact requesting user selects one of the contact links 152, 154, 156 at the user device 110, a request to communicate with the agent terminal 280, the agent phone 282, or the user device 210 is transmitted to the customer care site server 130. The communication management service 160 of the customer care site server 130 is operable to handle the received request in cooperation with the intermediary system 270, if necessary.

With continued reference to FIG. 2, the intermediary system 270 includes an Identity and Access Management (IAM) system 271, a Unified Access Gateway (UAG) 272, a Media Gateway (MGW) 273, and an IP Multimedia System (IMS) 274. The intermediary system 270 is a computing system operable to facilitate communication between two devices connected to two different communication networks respectively. For example, when the user device 110 is a tablet computer connected to an IP network 220 (Internet) and the agent device 282 is a telephone connected to a telecommunication network 222 (PSTN), the intermediary system 270 can facilitate communication between the user device 110 and the agent phone 282, which are connected to the two different networks 220, 222.

The Identity and Access Management system 271 is a computing system that facilitates the management of electronic identities. Identity and Access Management system 271 can be used to initiate, capture, record, and manage customer identities and their related access permissions in an automated fashion. The Unified Access Gateway 272 is a computing system that can connect a web RTC module, such as web RTC module 162 as depicted in FIG. 1 and which can be included in the communication management service 160 or 260 to the IP Multimedia System 274. The Media Gateway 273 is a device and/or service that converts digital media streams between disparate telecommunications networks. The IP Multimedia System 274 may generally enable multimedia communications across networks over multiple transport protocols.

In some embodiments, in response to a request via the contact links 152, 154, 156, the communication management service 160 provides information to two or more devices associated with the same user of the customer care site 140. For example, when a request to communicate with a customer care agent is made using the contact link 154, the communication management service 160 can establish a voice communication channel between the user device 110 and the agent phone 282 via the telecommunication network 222, as well as provide additional information to the customer care agent 280 in cooperation with the customer care call system 290.

The customer care call system 290 is a computing system that is configured to store and manage a variety of information related to customer care operations. In response to a request to communicate with a customer care agent, the communication management service 160 identifies the user device 110 (or the contact requesting user) and can transmit a request for additional information associated with the identified user device (or user). In response to the request for providing additional information to the customer care agent, the customer care call system 290 retrieves information associated with the identified user device (or user) from its associated database and forwards the retrieved information to the agent terminal 280.

Figure 3:
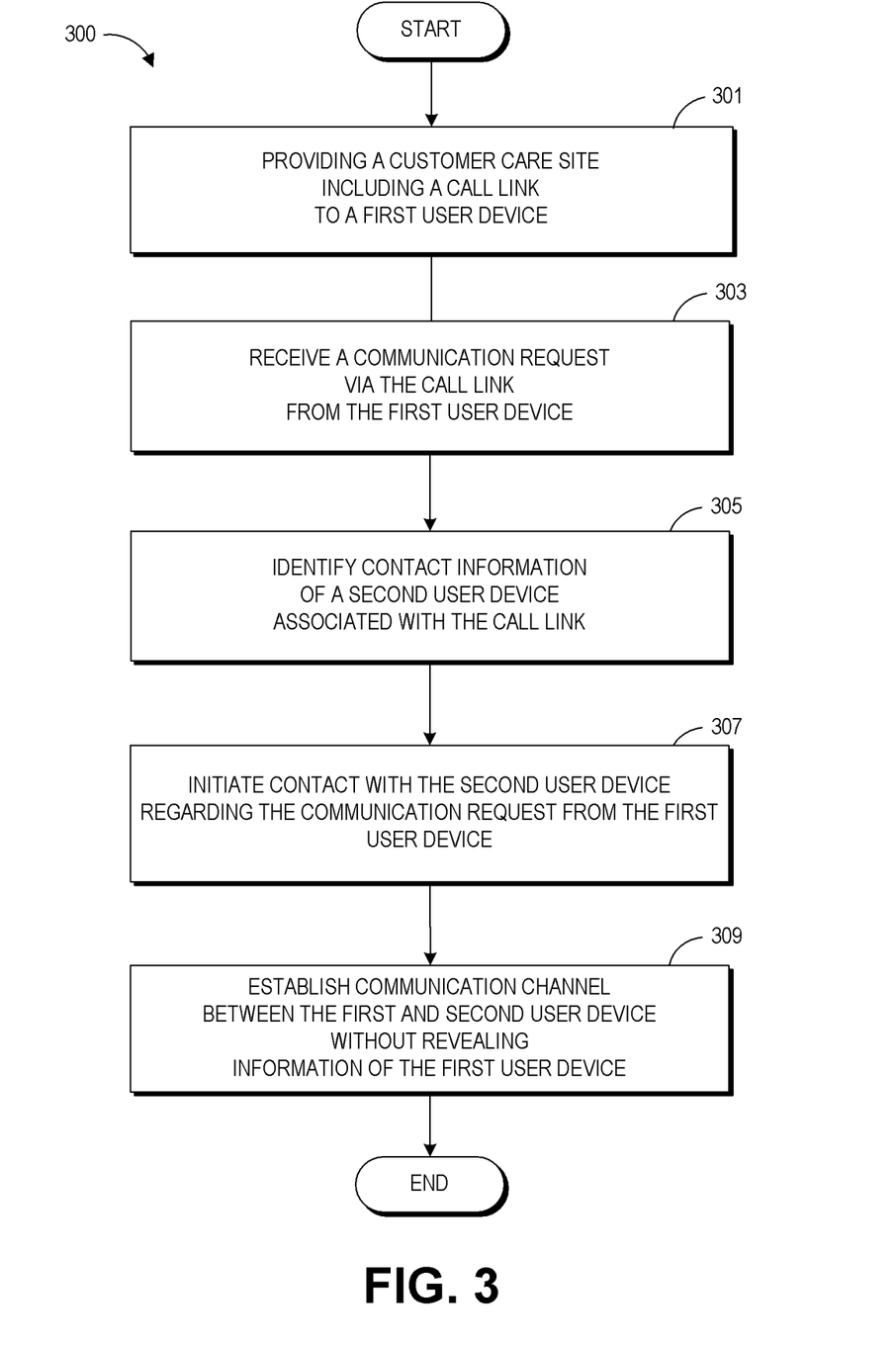
FIG. 3 is a block diagram illustrating processes for enabling communication between users of a customer care site.

FIG. 3 is a block diagram illustrating processes associated with facilitating communication between users of a customer care site 140. As will be further explained below, these processes includes aspects of exchanging and protecting user information between user devices and/or or customer care agents.

At block 301, the customer care site server 130 provides the customer care site 140 to a first user device 110. The customer care site 140 includes one or more pages providing an interface for users to submit questions or comments. These one or more pages, or other pages of the customer care site 140, may also include a plurality of questions and/or comments 151, 153, 155 previously submitted by users and/or customer care agents. The questions and/or comments are associated with corresponding contact links 152, 154, 156, which are also displayed on the one or more pages adjacent to their corresponding question and/or comment.

When a user of the customer care site 140 submits a question or comment through the provided interface, the customer care site server 130 can obtain, store, and/or process a plurality of different types of information about the user and/or submitted information. For example, the customer care site server 130 can obtain, store, and/or process contact information of a user submitting a question and/or comment and associate the contact information with the submitted question and/or comment. In some embodiments, the customer care site server 130 can request users to provide their contact information when they post a question and/or comment on the customer care site 140. In other embodiments, the customer care site server 130 may be able to automatically determine user contact information and associate with a submitted question and/or comment through the customer care site 140, such as when a user is already registered with the site and logged into the site when submitting the question and/or comment. The customer care site server 130 may also obtain other information about the user submitting the question and/or comment. Again, this additional information can be obtained either through an interface in the customer care site 140 when submitting the question and/or comment or through a registration process with the customer care site 140. This additional information can include identification of various user preferences, such as whether the user wants others to be able to contact them directly about a particular question and/or comment and any parameters defining how or when the user can be contacted.

The customer care site server 130 processes the user submitted question and/or comment and the user contact information to create a contact link that is then displayed in the customer care site 140 adjacent to the user's submitted question and/or comment. As noted above, the contact link may include one or more identifiers for enabling the customer care site server 130 to contact the target user upon subsequent selection of the contact link. The one or more identifiers may include a confidential identifier corresponding to the user who submitted the corresponding information and which does not disclose any information that would specifically identify that user to other users of the customer care site 140, thus maintaining the user's privacy.

Returning to FIG. 3, at block 303, the customer care site server 130 receives a communication request from the first user device 110 responsive to the first user's selection of a first contact link provided on a page in the customer care site 140. The communication request made via the first contact link includes information that identifies or can otherwise be used to identify contact information of a second user who posted the question and/or comment associated with the first contact link. For example, the request made via the first contact link can include an identification of the information included in the first contact link, which can include one or more identifiers that may be used to identify the user who posted the associated question or comment and/or identify the associated question or comment itself.

At block 305, the customer care site server 130 identifies contact information, and/or contact preferences, of a second user device (i.e., the destination user device of the second or target user) based on information contained in the request generated via selection of the first contact link. For example, the customer care site server 130 can identify a mobile phone number of a user who posted a question and/or comment associated with the first contact link. Additionally, the customer care site server 130 may also identify the specific question and/or comment associated with the first contact link based on the information contained in the request via selection of the first contact link. Yet further, the customer care site server 130 may identify other preferences of the second user, such as how and when the second user prefers to be contacted.

At block 307, the customer care site server 130 can contact the second user device regarding the communication request from the first user device. In some embodiments, the customer care site server 130 may preliminarily provide the second user device with information about the communication request from the first user device prior to establishing a communication channel between the first and second user devices. In particular, the customer care site server 130 may cause this information to be displayed on a display of the second user device 110 or any other device designed in the second user's preferences for receiving communications from the customer care site server 130. As an example of the provided information, the customer care site server 130 may provide the second user with identification of the question and/or comment which is the subject or basis for the requested communication. In addition or alternatively, the customer care site server 130 may provide the second user with identification of the first user initiating the requested communication. In other embodiments, the customer care site server 130 may provide the second user with an option to accept or reject the communication request from the first user, a response to which may be communicated back to the customer care site server 130 from the second user device. In yet other embodiments, block 307 may be optional or be determined to be unnecessary if the second user has stored preferences indicating, for example, that the second user will accept all communication requests and/or doesn't need any preliminary information about the communication request or first user.

At block 309, the customer care site server 130 utilizes the communication management service 160 to initiate a connection between the first and second user devices. In some embodiments, the communication management service 160 can utilize its web RTC module 162 to establish a voice/video communication channel between the first user device and the second user device. The communication management service 160 can also, in some embodiments, prevent, or otherwise not allow, the first user device (contact requesting device) to display contact information associated with the second user device (destination device). Likewise, the communication management service 160 can also prevent, or otherwise not allow, the second user device to display contact information associated with the first user device.

Figure 4:
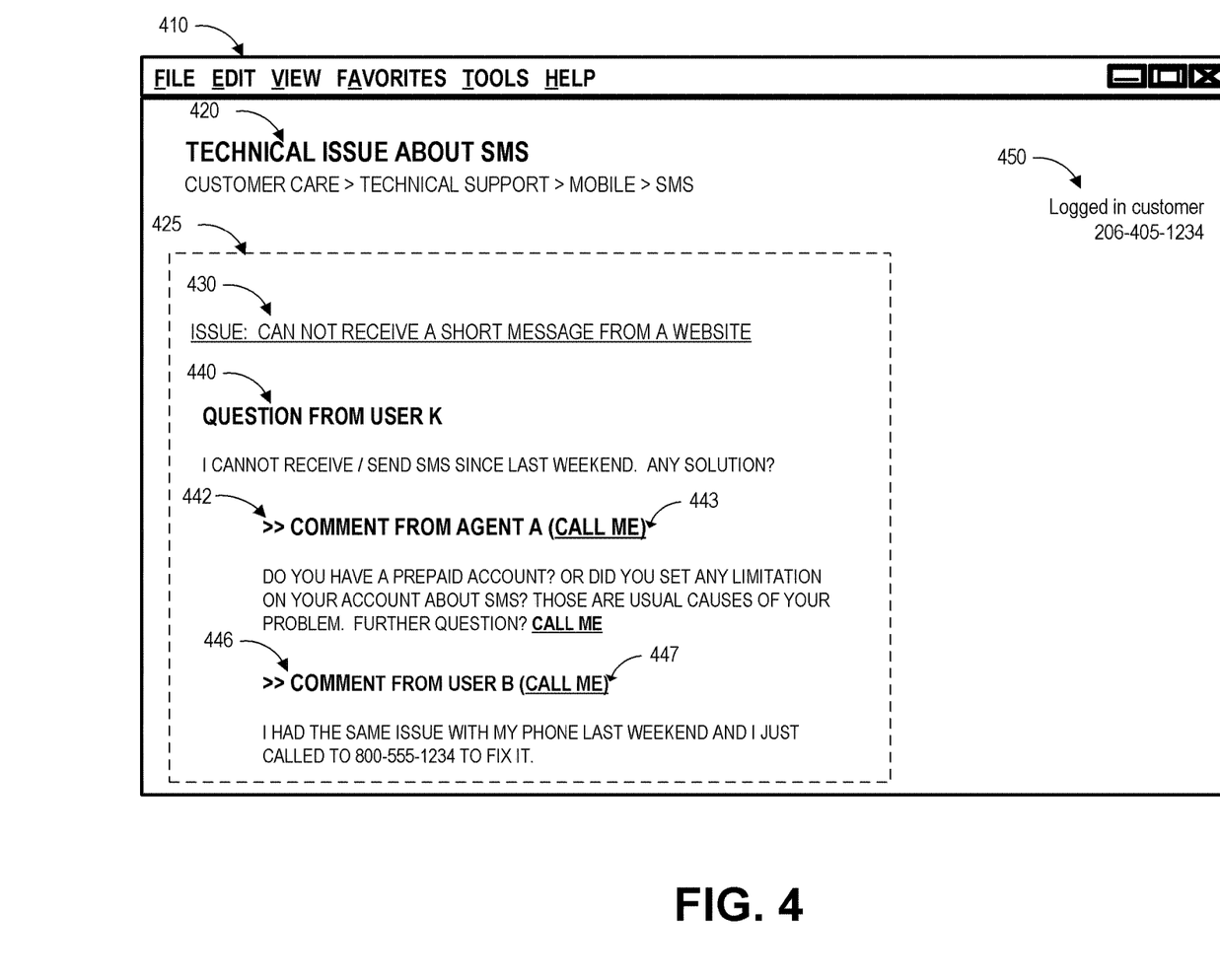
FIG. 4 illustrates an example of an electronic display including a discussion between multiple parties and one or more contact links associated with portions of the discussion.

FIG. 4 illustrates an example of an electronic display, such as of a web page, including a discussion between multiple parties and one or more contact links associated with portions of the discussion. In particular, a browser of a user device 110, 210 can display a discussion page 410 from the customer care site 140. The discussion page 410 displays a discussion forum 425 and an optional header 420, which can identify a subject category and/or a navigation bar associated with the discussion page 410. The discussion forum 425 can include a title or description of an issue 430 presented in the discussion forum 425. The discussion forum 425 may also include an initial question 440 that has been posted by a user (user K), as well as a number of other comments and/or questions. For example, the discussion forum 425 also includes a comment 442 from a customer care agent (agent A) and a comment 446 from another user (user B). Each of the comments 442 and 446 in the discussion forum 425 is associated with a contact link 443 and 447 displayed adjacent to the respective comments 442, 446. As noted above, selection of the contact links 443 and 447 causes the customer care site server 130 to generate a request to contact the corresponding user who posted the question and/or comment adjacent to the respective contact link. As also noted above, in some embodiments, the contact links 443 and 447 do not disclose or otherwise reveal the actual contact information of the author of the adjacent comment. The discussion page 410 may also include account identification and/or (actual) contact information 450 of the current user who logged into the customer care site 140 and viewing the discussion page 410 on his/her user device.

Figure 5:
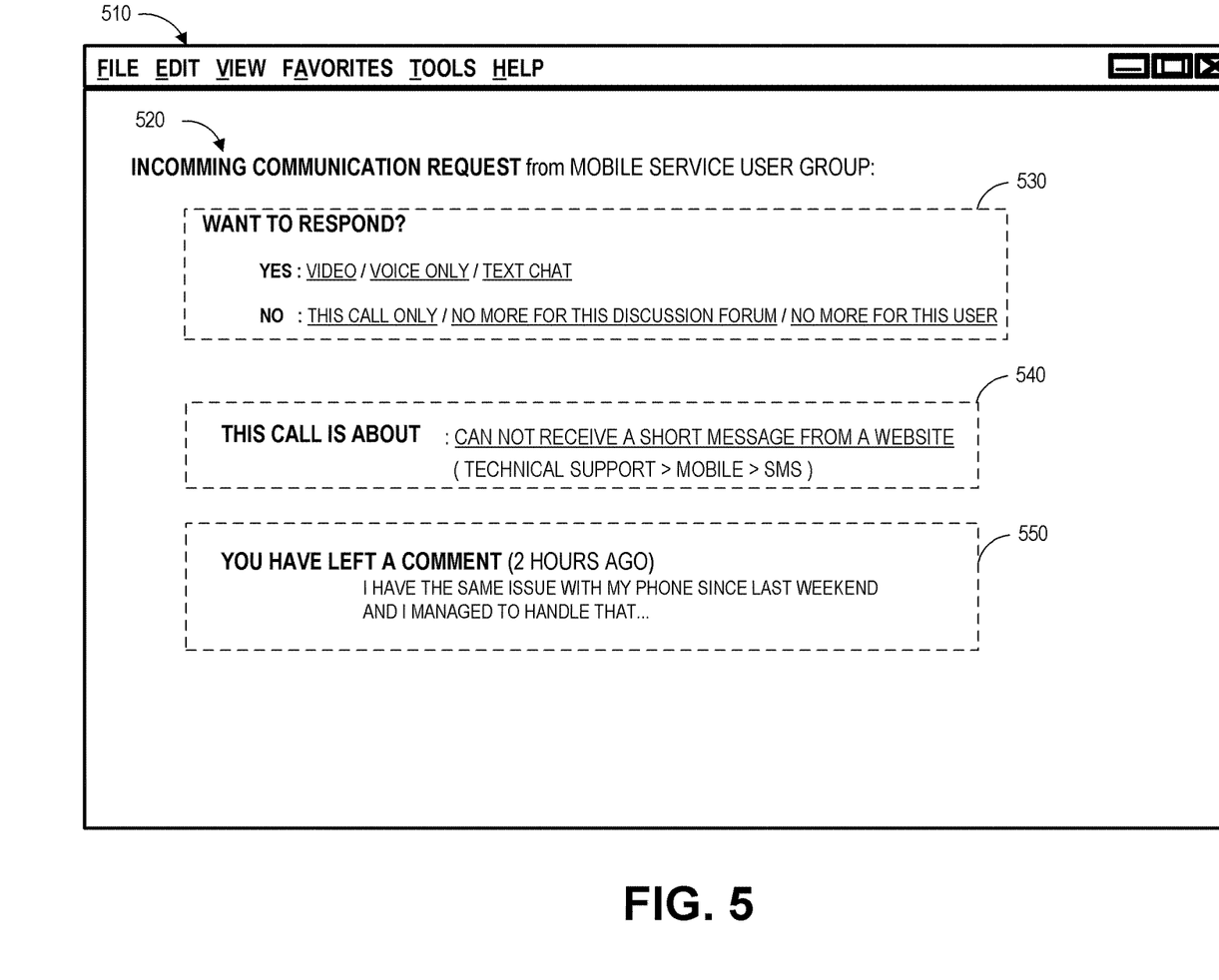
FIG. 5 illustrates an example of an electronic display including information provided to a target user about a contact requesting user's communication request.

FIG. 5 illustrates an example of an electronic display, such as of a web page, including information provided to a target user about a contact requesting user's communication request. In particular, a browser of a destination device 210 of a target user can display a preliminary communication request page 510 from the customer care site 140 responsive to a contact requesting user selecting a contact link, such as contact link 447 in FIG. 4. The communication request page 510 generally provides information to the target user about a communication request from a contact requesting user. The communication request page 510 can include a header 520 providing information about the origin of the incoming communication request. In some embodiment, as shown in FIG. 5, the header 520 does not reveal the actual contact information 450 of the contact requesting party. The communication request page 510 can also include an inquiry 530 for the target user to indicate whether or not to accept the communication request. The inquiry 530 may also include a request for the target user to further indicate other information about responding to the communication request, such as how the target user prefers to communicate with the contact requesting user (e.g., video, voice only, text chat) or when the target user will respond to the communication request (e.g., only once, no more for the particular discussion forum, no more for the particular contact requesting user). The communication request page 510 can also include a subject 540 about which the communication request pertains. The subject 540 may correspond, for example, to the title or description of the issue 430 presented in the discussion forum 425 in FIG. 4. The communication request page 510 can further include an identification 550 of the target user's comment from the discussion forum 410.

Figure 6:
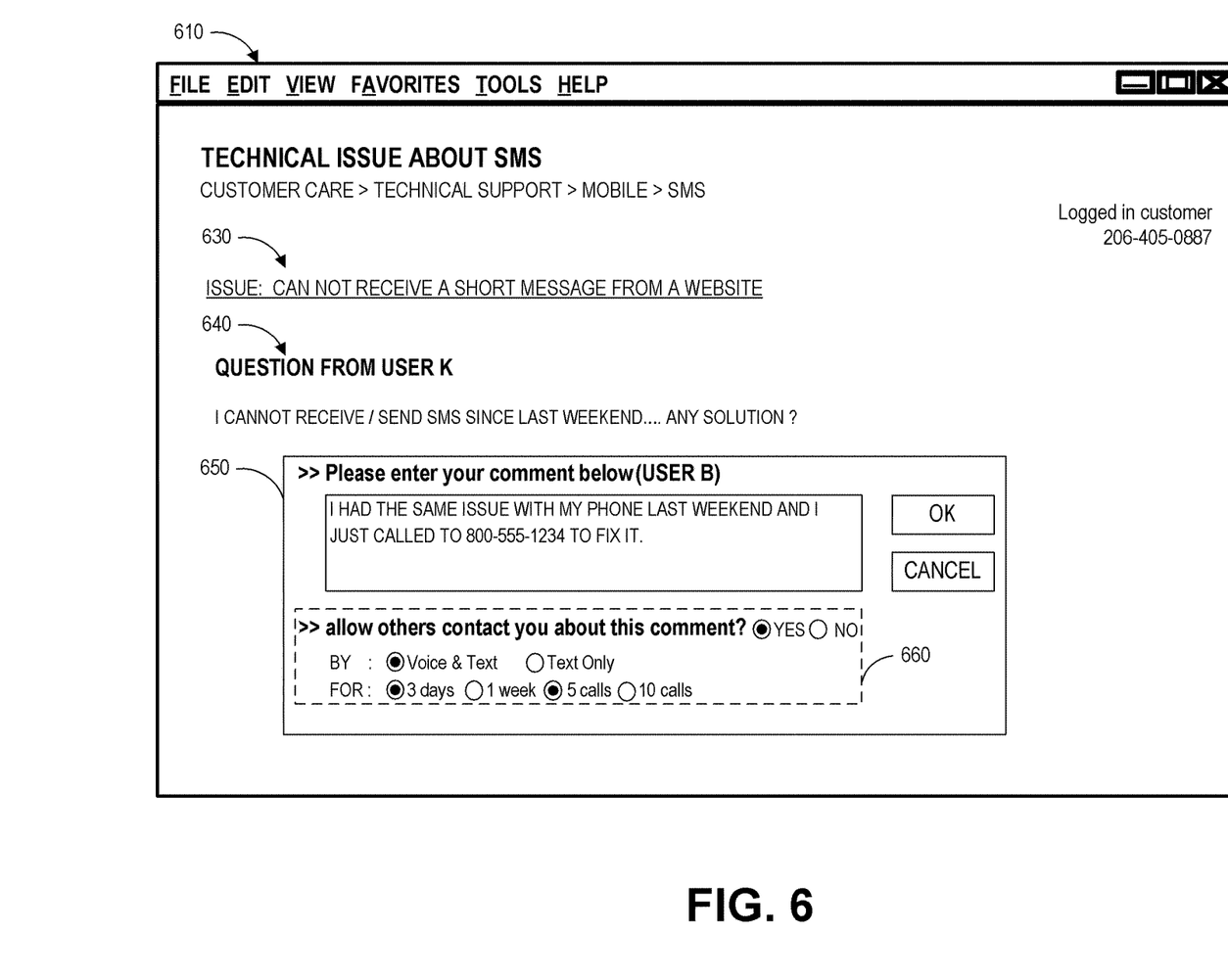
FIG. 6 illustrates an example of an electronic display including an interface to set one or more permissions or conditions for contacting a user via a call link at a customer care site.

FIG. 6 illustrates an example of an electronic display including an interface to set a permission or condition for contacting a user via a call link. In particular, a browser of a user device 110, 210 can display a discussion page 610 from the customer care site 140. The discussion page 610 displays a title or description of an issue 630 and a question 640 that has been posted by a user K. The discussion page 610 displays a first interface portion 650 for receiving a comment from another user B. The discussion page 610 displays a second interface portion 660 for receiving input from the user B about one or more permissions or conditions for contacting the user B via a call link. For example, as shown in FIG. 6, the second interface portion 660 may allow user B to designate whether others are allowed to contact user B about the comment. In addition, the second interface portion 660 may have other criteria that can be designated by user B regarding parameters for the allowed contact, such as how user B may be contacted (e.g., by voice and text communication or by text communication only), for what period of time user B may be contacted (e.g., for 3 days or 1 week from posting of the comment), and/or how many total times user B may be contacted (e.g., 5 or 10 total times or any other threshold beyond which contact with user B will be prevented via the customer care web site 140). When user B confirms or otherwise allows a comment to be posted to the customer care web site 140, a call link to contact user B can be displayed in the discussion page 610, such as the call link 447 depicted in FIG. 4.

It will be appreciated by those skilled in the art that all of the functions described in this disclosure may be embodied in software executed by one or more physical processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without customer input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored assume in a computer-readable medium and loaded into memory of the computing device using a drive mechanism associated with a computer readable storage medium storing the computer executable components such as a CD ROM, DVD ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
as implemented by one or more computing devices configured with specific computer-executable instructions:
providing, over a network, a first web page from a customer care web site, the first web page comprising a first content item posted by a first user and a first contact link for requesting communication with the first user, wherein the first content item posted by the first user comprises a question or a comment posted by the first user in a discussion forum on the first web page of the customer care web site;
providing a data store maintaining first contact information of the first user in association with the first contact link and the first content item, wherein the first contact information corresponds to identification of a first user device of the first user;

receiving a contact request, from a second user, to initiate a communication with the first user by selecting the first contact link on the first web page at a second user device of the second user, wherein the second user device is associated with second contact information; and in response to the contact request, (a) identifying the first contact information of the first user and the first content item from the data store using information included in the contact request; and (b) causing a communication session to be established between the first user device and the second user device using the first contact information and the second contact information, wherein causing the communication session to be established includes causing display of a contact request notification at the first user device, wherein the contact request notification includes information about the contact request including an option to deny the contact request, wherein the contact request notification includes an identification of the first content item associated with the first contact link, and wherein the contact request notification excludes identification of the second contact information.

2. The computer-implemented method of claim 1, wherein the contact request notification is caused to be displayed at the first user device prior to establishing the communication session.

3. The computer-implemented method of claim 2, wherein the contact request notification is caused to be displayed at the first user with an interface configured to receive the first user's determination regarding whether to deny the contact request.

4. The computer-implemented method of claim 1 further comprising:
maintaining, in the data store, a criterion for allowing initiation of a communication session in response to selection of the first contact link in association with the first contact information; and
prior to causing initiation of a communication session to be established between the first user device and the second user device, checking the criterion associated with the first contact information for allowing the communication session.

5. The computer-implemented method of claim 1, wherein causing the communication session to be established between the first user device and the second user device comprises:
establishing a first communication session with the first user device using the first contact information;
establishing a second communication session with the second user device using the second contact information; and
connecting the first communication session and the second communication session without providing the second contact information to the first user device.

6. The computer-implemented method of claim 5, wherein connecting the first communication session and the second communication session further comprises:
connecting the first communication session and the second communication session without providing the first contact information to the second user.

7. A computing system comprising a processor coupled to a memory, the memory including specific instructions that upon execution configure the computing system to at least:
provide over a network, a first web page from a customer care web site, the first web page comprising a first content item posted by a first user and a first contact link for requesting communication with the first user, wherein the first content item posted by the first user comprises a question or a comment posted by the first user in a discussion forum on the first web page of the customer care web site provide a data store maintaining first contact information of the first user in association with the first contact link and the first content item, wherein the first contact information corresponds to identification of a first user device of the first user;

receive a contact request, from a second user, to initiate a communication with the first user by selecting the first contact link on the first web page at a second user device of the second user, wherein the second user device is associated with second contact information; and in response to the contact request, (a) identify the first contact information of the first user and the first content item from the data store using information included in the contact request; and (b) cause a communication session to be established between the first user device and the second user device using the first contact information and the second contact information, wherein causing the communication session to be established includes causing display of a contact request notification at the first user device, wherein the contact request notification includes information about the contact request including an option to deny the contact request, wherein the contact request notification includes an identification of the first content item associated with the first contact link, and wherein the contact request notification excludes identification of the second contact information.

8. The computing system of claim 7, wherein the contact request notification is displayed at the first user device prior to establishing the communication session.

9. The computing system of claim 8, wherein the contact request notification is displayed at the first user with an interface configured to receive the first user's determination regarding whether to deny the contact request.

10. The computing system of claim 7, wherein the specific instructions upon execution further configure the computing system to:
maintain in the data store, a criterion for allowing a communication session in response to selection of the first contact link in association with the first contact information; and
prior to causing a communication session to be established between the first user device and the second user device, check the criterion associated with the first contact information for allowing the communication session.

11. The computing system of claim 7, wherein causing the communication session to be established between the first user device and the second user device comprises:
establishing a first communication session with the first user device using the first contact information;
establishing a second communication session with the second user device using the second contact information; and
connecting the first communication session and the second communication session without providing the second contact information to the first user device.

12. The computing system of claim 11, wherein connecting the first communication session and the second communication session further comprises:

connecting the first communication session and the second communication session without providing the first contact information to the second user.

13. A non-transitory computer storage medium storing computer-executable instructions that direct a computing device to perform operations comprising:
as implemented by one or more computing devices configured with specific computer-executable instructions:
providing, over a network, a first web page from a customer care web site, the first web page comprising a first content item posted by a first user and a first contact link for requesting communication with the first user, wherein the first content item posted by the first user comprises a question or a comment posted by the first user in a discussion forum on the first web page of the customer care web site;
providing a data store maintaining first contact information of the first user in association with the first contact link and the first content item, wherein the first contact information corresponds to identification of a first user device of the first user;
receiving a contact request, from a second user, to initiate a communication with the first user by selecting the first contact link on the first web page at a second user device of the second user, wherein the second user device is associated with second contact information; and
in response to the contact request, (a) identifying the first contact information of the first user and the first content item from the data store using information included in the contact request; and (b) causing a communication session to be established between the first user device and the second user device using the first contact information and the second contact information, wherein causing the communication session to be established includes causing display of a contact request notification at the first user device, wherein the contact request notification includes information about the contact request including an option to deny the contact request, wherein the contact request notification includes an identification of the first content item associated with the first contact link, and wherein the contact request notification excludes identification of the second contact information.

14. The non-transitory computer storage medium of claim 13, the operations further comprising:
maintaining, in the data store, a criterion for allowing initiation of a communication session in response to selection of the first contact link in association with the first contact information; and
prior to causing initiation of a communication session to be established between the first user device and the second user device, checking the criterion associated with the first contact information for allowing the communication session.

15. The non-transitory computer storage medium of claim 13, the operations further comprising:
establishing a first communication session with the first user device using the first contact information;
establishing a second communication session with the second user device using the second contact information; and
connecting the first communication session and the second communication session without providing the second contact information to the first user device.

16. The non-transitory computer storage medium of claim 15, wherein connecting the first communication session and the second communication session further comprises:
connecting the first communication session and the second communication session without providing the first contact information to the second user.

* * * * *